March 15, 1927.  1,621,320
J. F. GRIFFIN
PRESSURE GAUGE
Filed Oct. 3, 1923

WITNESS
G. V. Rasmussen

INVENTOR
JOSEPH F. GRIFFIN
BY
Biesen & Schuck
ATTORNEYS

Patented Mar. 15, 1927.

1,621,320

UNITED STATES PATENT OFFICE.

JOSEPH F. GRIFFIN, OF BROOKLYN, NEW YORK, ASSIGNOR TO THE SUPERHEATER COMPANY, OF NEW YORK, N. Y., A CORPORATION OF DELAWARE.

PRESSURE GAUGE.

Application filed October 3, 1923. Serial No. 666,262.

In the development of locomotive equipment, and in order to increase the efficiency of the locomotive, advanced engineering practice has resorted to the installation of a feed water heater and a reciprocating feed water pump supplying the feed water to the boiler. As it is impossible for the engineer to have the pump under his immediate observation at all times in order to determine whether it is functioning properly, and as the water pressure produced in the feed water line by the reciprocations of the pump is an oscillating pressure, it has heretofore been the practice for the engineer to use the regular water pressure gauge as an indicator; the oscillations of the needle of the gauge indicating that the pump is operating. The delicate mechanism of the ordinary pressure gauge is not designed to withstand the shocks due to these rapid and continuous oscillations, and consequently its accuracy is rapidly impaired.

The principal object of this invention is to provide a new and improved construction of a pressure gauge by means of which an auxiliary Bourdon tube connected with an oscillating indicator is provided upon the pressure gauge in addition to the usual Bourdon tube and indicating needle. Another object is to provide a connecting mechanism, from the auxiliary Bourdon tube to the oscillating indicator, of great strength and of a minimum number of moving parts so as to withstand the continuous oscillations. A further object is to provide resilient means in said connections to check or absorb the violence of the stains upon the auxiliary Bourdon tube and the oscillating indicator while maintaining its capacity to oscillate.

For the accomplishment of these and such further objects as will be apparent to those skilled in the art to which this appertains, my invention consists in the construction, combination and arrangement of parts a preferred embodiment of which is hereinafter more specifically described and is illustrated in the accompanying drawings forming a part hereof, but it is to be understood that changes, variations and modifications may be resorted to without departing from the spirit of my invention.

Figure 1:
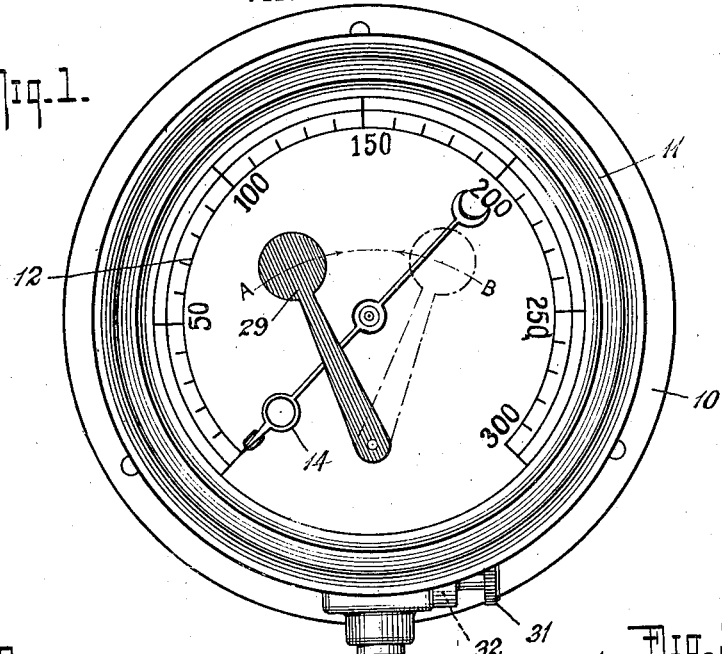
Figure 2:
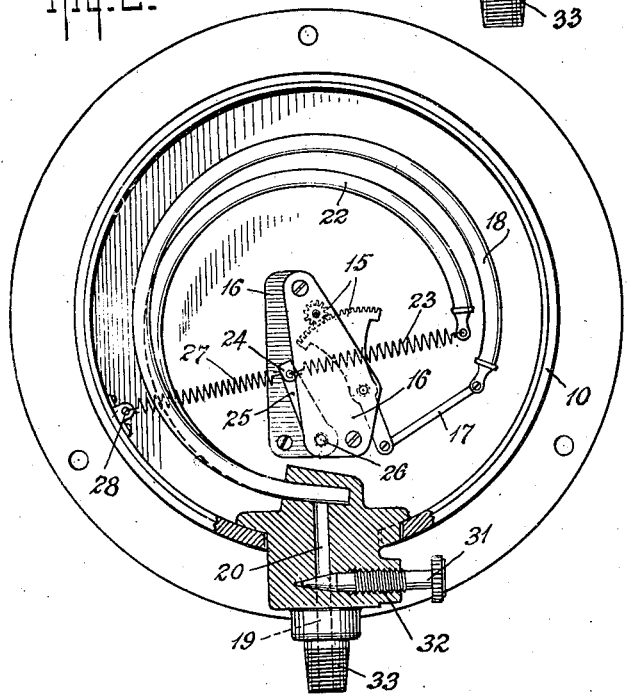
Figure 3:
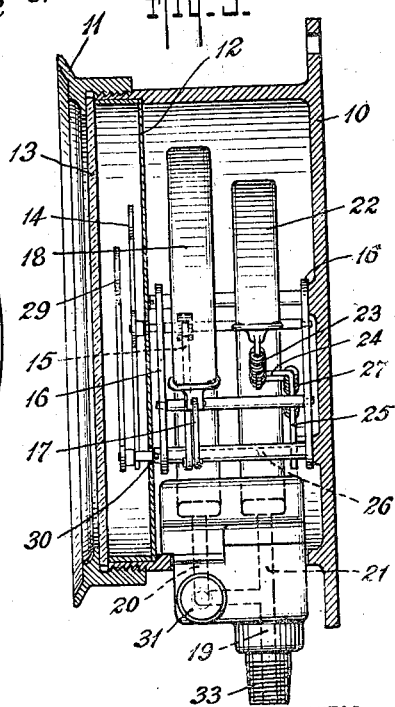

Referring to the drawings Fig. 1 is a front elevation of a pressure gauge embodying my invention, Fig. 2 is a front elevation partly in section of the gauge with the dial and glass removed and Fig. 3 is a central vertical section through the gauge. As shown in the drawings the numeral 10 indicates the casing of the gauge to which is secured by means of the bezel 11, a dial 12 and glass 13. A pivotally mounted indicating needle or pointer 14 is connected by the gearing mechanism 15 mounted in the framework 16, and a link 17 to the free end of a main Bourdon tube 18 which communicates with the main inlet passage 19, by means of a branch passage 20. The above construction, which is a common form employed for pressure gauges, is merely illustrative and may obviously be varied as desired.

A second branch inlet passage 21 leads from the passage 19, and communicates with an auxiliary Bourdon tube 22, to the free end of which is connected one end of a coiled spring 23. The other end of spring 23 is connected to the inwardly bent end 24 of a short lever 25, which is fixed to the rear end of a shaft 26 located below the pivotal mounting of needle 14, and suitably journalled for rotation in the framework 16. A second coiled spring 27, has its inner end secured to the outer end of lever 25 adjacent the rear wall of the casing 10, and extends across to the side wall of the casing to which the other end of the spring 27 is suitably anchored as at 28. A semaphore 29 is suitably secured as by a frictionally engaged pin and socket connection 30 to the outer or front end of the shaft 26, and a needle valve 31 is screw-threaded into a threaded boss 32 to control the inlet passage 19 to the main Bourdon tube 18. The usual screw-threaded nipple 33 is provided for securing the gauge to the pressure line. If desired, a valve may also be interposed in the passage to the auxiliary Bourdon tube.

The operation of the gauge is as follows: let it be assumed that the gauge is connected to a pressure line in which the pressure is oscillating, as in the feed water line of a locomotive engine, and that it is desired to have the semaphore indicate by its oscillations whether the pump is functioning properly. Under these conditions it is desirable to prevent damage to the usual indicating needle 14 and its actuating mechanism, therefore valve 31 will be closed to render the main Bourdon tube 18 inoperative. The variations or oscillations of the pressure in the line which are caused by the reversal of the piston in the water pump will cause the auxiliary Bourdon tube 22 to oscillate in accordance with the well known properties of such tubes. The oscillations of the auxiliary Bourdon tube will be communicated, by spring 23, lever 25, and shaft 26, to the semaphore 29 causing it to oscillate to and fro in front of the dial, as indicated by the line A—B in Fig. 1, the semaphore moving to the dotted line position at maximum pressure in the line, and being carried back to the full line position when the pressure is at minimum value by the resiliency of the Bourdon tube, assisted by the tension of spring 27.

It will be noted that the springs 23 and 27 are located in substantial parallelism in a common plane which passes through the pivotal connection 28, the end of lever 25 and the free end of Bourdon tube 22. Because of the use of the springs 23 and 27, the shocks due to the motion of the Bourdon tube 22 will be absorbed to a sufficient degree by the resiliency of the springs to prevent damage to the semaphore. Furthermore, as the semaphore, the shaft 26 and lever 25 constitute in effect a single movable member it will be seen that there is no complicated nor delicate mechanism to get out of order.

The provision of the auxiliary Bourdon tube 22 not only serves to prevent destruction of the gauge by furnishing an auxiliary indicating mechanism of a simple, sturdy construction which can be used continuously to indicate the operation of the feed water pump, but it also serves to absorb the shocks transmitted by the pressure oscillations to the main Bourdon tube and the pressure indicating mechanism when a pressure reading is taken.

When it is desired to take a pressure reading the valve 31 is opened to establish communication between the passages 19 and 20 but to also choke or throttle to a certain extent the amount of water which surges through the conduit 19; it will thus be seen that in the first place the force of the pressure oscillations within the passage or conduit 20 will not be as violent as in the passage or conduit 21. In the second place, the force of the shocks will be distributed between the two Bourdon tubes, thus lessening to a considerable extent the amount of the shock which, but for the provision of the auxiliary tube, would be transmitted entirely to the main tube. Finally as the main tube and its connecting mechanism to the needle 14 offers a greater resistance to movement than offered by the auxiliary tube and its connecting mechanism, the amplitude of movement of the auxiliary tube is greater than that of the main tube. It will therefore be seen that the auxiliary tube 22 provides in effect a shock absorbing mechanism which, disregarding the differences in the resistance to movement of the tubes, may be compared to the action of the air chamber commonly used on the discharge side of a water pump; and which, when the differences in resistance are considered, may be compared to the action of a pair of movable pistons within a cylinder in which the pressure is oscillating; one of the pistons offering a greater resistance to movement than the other. Because of these shock-absorbing functions performed by the auxiliary Bourdon tube, the needle 14 exhibits only a very slight tendency to oscillate, consequently a pressure reading of much greater accuracy may be obtained with a gauge constructed as disclosed herein than if only the usual single tube were used.

I claim:

1. In a pressure gauge, the combination of a main Bourden tube connected with a source of oscillating pressure, an indicating needle, mechanism connecting said needle with said main Bourdon tube, the latter and said mechanism possessing an inherent flexibility of predetermined degree, an auxiliary Bourdon tube connected with the same source of oscillating pressure, an oscillation indicator, and resilient connections between the indicator and said auxiliary Bourdon tube, the latter and its connections possessing an inherent flexibility of lesser degree that that of the main Bourdon tube and its connections, whereby said auxiliary Bourdon tube is flexed to absorb the shocks of said pressure oscillations and said indicating device is actuated to indicate said oscillations.

2. In a pressure gauge, the combination of a main Bourdon tube connected with a source of oscillating pressure, an indicating needle, mechanism connecting said needle with said main Bourdon tube, the latter and said mechanism possessing an inherent flexibility of predetermined degree, an auxiliary Bourdon tube connected with the same source of oscillating pressure, an oscillation indicator, resilient connections between the indicator and said auxiliary Bourdon tube, the latter and its connections possessing an inherent flexibility of lesser degree that that of the main Bourdon tube and its connections, whereby said auxiliary Bourdon tube is flexed to absorb the shocks of said pressure oscillations and said indicating device is actuated to indicate said oscillations, and a valve manually controlled independently of said Bourdon tubes for closing the connection between said main Bourdon tube and said source of pressure without disturbing the connection between the latter and said auxiliary Bourdon tube.

3. In a pressure gauge, the combination of a main Bourdon tube, a pressure indicator operatively connected therewith, an auxiliary Bourdon tube, an oscillation indicator operatively connected with said auxiliary Bourdon tube, a branched conduit connecting both of said Bourdon tubes with a common source of oscillating pressure, and a valve operated independently of said Bourdon tubes for closing the connection between one of said Bourdon tubes and said source of oscillating pressure without disturbing the connection between the latter and the other Bourdon tube.

4. In a pressure gauge, a main Bourdon tube, a pressure indicating needle, means to connect said needle and main Bourdon tube, an auxiliary Bourdon tube, a pivotally mounted two-armed bell crank one arm of which forms an indicator, and means connecting the other arm of said bell crank to said auxiliary Bourdon tube.

5. In a pressure gauge, (a main Bourdon tube, a pressure indicating needle, means to connect said needle and main Bourdon tube), an auxiliary Bourdon tube, a pivotally mounted two-armed bell crank, one arm of which forms an indicator, a coiled spring connecting the other arm of said bell crank to the auxiliary Bourdon tube and an anchoring spring connecting said other arm to the casing of said pressure gauge.

6. In a pressure gauge, a Bourdon tube, a movable indicator, a spring connecting one end of said indicator with said Bourdon tube, and an anchoring spring connected with said indicator and a fixed part of the pressure gauge.

7. In a pressure gauge, a Bourdon tube, a pivotally mounted two-armed ball crank, one arm of which forms an indicator, a coiled spring connecting the other arm of said bell crank to said Bourdon tube and an anchoring spring connecting said other arm to a fixed part of said pressure gauge.

8. In a pressure gauge, a casing provided with means adapted to be secured to a pressure system in which the pressure is oscillating, said casing having a conduit provided with a pair of branch passages, one of said branch passages leading to the usual Bourdon tube with which such gauges are provided and the other of said passages leading to a shock absorbing member having a freer degree of movement than said Bourdon tube whereby the major part of the shocks due to the pressure oscillations within said pressure line and gauge will be absorbed by said shock absorbing member.

JOSEPH F. GRIFFIN.